US010274078B2

(12) United States Patent
Ichimura et al.

(10) Patent No.: US 10,274,078 B2
(45) Date of Patent: Apr. 30, 2019

(54) HYDRAULIC CIRCUIT FOR TRANSMISSION

(71) Applicant: HONDA MOTOR CO., LTD., Tokyo (JP)

(72) Inventors: Yasuyuki Ichimura, Wako (JP); Shigeji Nakano, Wako (JP); Tomoaki Yageta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 15/114,210

(22) PCT Filed: Jan. 29, 2015

(86) PCT No.: PCT/JP2015/052452
§ 371 (c)(1),
(2) Date: Jul. 26, 2016

(87) PCT Pub. No.: WO2015/119028
PCT Pub. Date: Aug. 13, 2015

(65) Prior Publication Data
US 2017/0009877 A1    Jan. 12, 2017

(30) Foreign Application Priority Data
Feb. 10, 2014  (JP) ................................ 2014-022944

(51) Int. Cl.
*F16H 61/02* (2006.01)
*F16H 61/00* (2006.01)
*F16H 57/04* (2010.01)

(52) U.S. Cl.
CPC ..... *F16H 61/0021* (2013.01); *F16H 57/0436* (2013.01); *F16H 57/0446* (2013.01);
(Continued)

(58) Field of Classification Search
CPC ............ F16H 61/0021; F16H 61/0031; F16H 61/0025; F16H 61/0206; F16H 57/0436; F16H 57/0446; F15B 20/007
See application file for complete search history.

(56) References Cited

U.S. PATENT DOCUMENTS 8,943,818 B2 * 2/2015 Ogata ................. F16H 61/0031
                                                60/421
9,522,642 B2 * 12/2016 Ishikawa ................ B60K 6/547
(Continued)

FOREIGN PATENT DOCUMENTS

| CN | 101135372 A | 3/2008 |
|----|-------------|--------|
| CN | 101809329 A | 8/2010 |
| CN | 102414483 A | 4/2012 |
| CN | 103133688 A | 6/2013 |

(Continued)

OTHER PUBLICATIONS

Office Action dated Jan. 25, 2017, issued in counterpart Chinese Patent Application 201580003530.4, with English translation. (10 pages).

(Continued)

*Primary Examiner* — Abiy Teka
(74) *Attorney, Agent, or Firm* — Westerman, Hattori, Daniels & Adrian, LLP

(57) ABSTRACT

A hydraulic circuit for a transmission including a main pump and a sub pump is provided in which when the main pump and the sub pump are driven by an engine after it has been stopped for a long time, due to the internal pressure of a torque converter being low, a sufficient hydraulic pressure cannot be transmitted to a feedback port of a switching valve via a fifth oil passage; communication between a first port and a second port of the switching valve is cut off, and the oil discharged by the sub pump is therefore not supplied to a lubrication system via a sixth oil passage but is supplied via the path: second oil passage→first port of switching (Continued)

valve→fourth oil passage→first port and second port of second pressure regulating valve→torque converter.

9 Claims, 6 Drawing Sheets

(52) U.S. Cl.
CPC ..... *F16H 61/0025* (2013.01); *F16H 61/0031* (2013.01); *F16H 61/0206* (2013.01); *F16H 2061/0037* (2013.01)

(56) References Cited

U.S. PATENT DOCUMENTS

| | | | |
|---|---|---|---|
| 9,829,091 B2 * | 11/2017 | Van Wijk | ............ F16H 61/0025 |
| 2012/0011841 A1 | 1/2012 | Ogata et al. | |

FOREIGN PATENT DOCUMENTS

| | | |
|---|---|---|
| JP | 2004-353694 A | 12/2004 |
| JP | 2007-85485 A | 4/2007 |
| JP | 2008-157322 A | 7/2008 |
| JP | 4244592 B2 | 3/2009 |
| WO | 2010/131345 A1 | 11/2010 |

OTHER PUBLICATIONS

International Search Report dated May 12, 2015, issued in counterpart International Application No. PCT/JP2015/052452 (2 pages).

* cited by examiner

HYDRAULIC CIRCUIT FOR TRANSMISSION

TECHNICAL FIELD

The present invention relates to a hydraulic circuit for a transmission that includes a main pump and a sub pump driven by a common drive source, oil discharged by the main pump being supplied to a transmission control system, and oil discharged by the sub pump being supplied to a lubrication system.

BACKGROUND ART

A hydraulic circuit for supplying oil to a pulley oil chamber, a torque converter, and a lubrication system of a transmission by means of a main pump and a sub pump simultaneously driven by an engine, in which, when the hydraulic pressure of the torque converter or the lubrication system decreases due to an insufficient discharge flow rate of the main pump at a time of sudden acceleration or sudden deceleration of a vehicle, the destination to which oil discharged by the sub pump is supplied is switched in the order: pulley oil chamber, torque converter, and lubrication system is known from Patent Document 1 below.

RELATED ART DOCUMENTS

Patent Documents

Patent Document 1: Japanese Patent No. 4244592

SUMMARY OF THE INVENTION

Problems to be Solved by the Invention

When a vehicle is in a stopped state for a long time, the oil in the interior of the torque converter of the transmission is drained due to gravity, it takes time to fill the torque converter with oil after the oil pump operates when the engine is subsequently started and there is the problem that, due to the torque converter being incapable of transmitting the driving force, starting of the vehicle is delayed.

In the above conventional hydraulic circuit also, since oil discharged by the oil pump when starting the engine is first used for filling the pulley oil chamber before filling the torque converter, there is a possibility that the starting of the vehicle will be delayed.

The present invention has been accomplished in light of the above circumstances, and it is an object thereof to provide a hydraulic circuit for a transmission equipped with a main pump and a sub pump, filling of a torque converter with oil being carried out speedily.

Means for Solving the Problems

In order to attain the above object, according to a first aspect of the present invention, there is provided a hydraulic circuit for a transmission comprising a main pump and a sub pump driven by a common drive source, oil discharged by the main pump being supplied to a transmission control system, and oil discharged by the sub pump being supplied to a lubrication system the hydraulic circuit comprises a switching valve that assists the main pump by increasing a discharge pressure of the sub pump when a discharge flow rate of the main pump is insufficient, a first pressure regulating valve that adjusts a hydraulic pressure supplied from the main pump to the transmission control system, a first oil passage that connects a discharge port of the main pump and a first port of the first pressure regulating valve, a second oil passage that connects a discharge port of the sub pump and a first port of the switching valve, a third oil passage that connects the discharge port of the main pump and the discharge port of the sub pump, a one-way valve that is disposed in the third oil passage and opens when the discharge pressure of the sub pump is higher than the discharge pressure of the main pump, a second pressure regulating valve that adjusts a hydraulic pressure supplied from the main pump or the sub pump to a torque converter, a fourth oil passage that connects the first port of the switching valve and a first port of the second pressure regulating valve, a fifth oil passage that connects a second port of the first pressure regulating valve, a second port of the second pressure regulating valve, and a feedback port of the switching valve, and a sixth oil passage that connects a second port of the switching valve and the lubrication system.

Further, according to a second aspect of the present invention, in addition to the first aspect, the second pressure regulating valve comprises a feedback port that is connected to the second port thereof, and when an internal pressure of the torque converter attains a predetermined value or greater, communication between the first port and the second port of the second pressure regulating valve is cut off and the first port and the second port of the switching valve are made to communicate with each other.

Furthermore, according to a third aspect of the present invention, in addition to the first or second aspect, the first pressure regulating valve comprises a feedback port that is connected to the first port thereof, and when the internal pressure of the torque converter attains a predetermined value or below, communication between the first port and the second port of the switching valve is cut off.

Moreover, according to a fourth aspect of the present invention, in addition to the third aspect, the hydraulic circuit comprises a solenoid valve that operates the switching valve to a position where communication between the first port and the second port is cut off.

Further, according to a fifth aspect of the present invention, in addition to any one of the first to fourth aspects, the sub pinup has a low discharge pressure and a large discharge flow rate compared with the main pump.

An engine E of an embodiment corresponds to the drive source of the present invention, and pulley oil chambers 27a and 28a of the embodiment correspond to the transmission control system of the present invention.

Effects of the Invention

In accordance with the first aspect of the present invention, the hydraulic circuit for a transmission includes the main pump and the sub pump driven by the common drive source, the oil discharged by the main pump is supplied to the transmission control system, and the oil discharged by the sub pump is supplied to the lubrication system. When the discharge flow rate of the main pump is insufficient, the main pump is assisted by increasing the discharge pressure of the sub pump by means of the switching valve, thus enabling the main pump to be made small in size and the drive load to be reduced.

When the situation is normal, the oil discharged by the main pump is supplied via the path: first oil passage→first port of first pressure regulating valve→transmission control system, thus catering for control of speed change of the transmission, and the oil discharged by the sub pump is supplied via the path: second oil passage→first port and second port of switching valve→sixth oil passage→lubrication system, thus catering for lubrication, and during this process the one-way valve of the third oil passage is closed, thereby cutting off communication between the first oil passage and the second oil passage.

When the main pump and the sub pump are driven by means of the drive source after it has been stopped for a long time, due to the internal pressure of the torque converter being low a sufficient hydraulic pressure cannot be transmitted to the feedback port of the switching valve via the fifth oil passage; communication between the first port and the second port of the switching valve is cut off, and the oil discharged by the sub pump is therefore not supplied to the lubrication system but is supplied via the path: second oil passage→first port of switching valve→fourth oil passage→first port and second port of second pressure regulating valve→torque converter, thus promptly filling the interior of the torque converter with oil and enabling the driving force to be transmitted.

Furthermore, in accordance with the second aspect of the present invention, since the second pressure regulating valve includes the feedback port that is connected to the second port thereof, and when the internal pressure of the torque converter attains a predetermined value or greater communication between the first port and the second port of the second pressure regulating valve is cut off and the first port and the second port of the switching valve are made to communicate with each other, the oil discharged by the sub pump is supplied only to the lubrication system, thus enabling the drive load of the sub pump to be reduced.

Moreover, in accordance with the third aspect of the present invention, since the first pressure regulating valve includes the feedback port that is connected to the first port thereof, when the hydraulic pressure of the transmission control system becomes insufficient due to a sudden speed change, communication between the first port and the second port of the first pressure regulating valve is cut off, and hydraulic pressure is not supplied to the torque converter. As a result, when the internal pressure of the torque converter attains a predetermined value or below, communication between the first port and the second port of the switching valve is cut off, and all of the oil discharged by the sub pump is therefore supplied to the transmission control system side, thus enabling a rapid speed change to be carried out and ensuring the speed change responsiveness at a time of sudden speed change.

Furthermore, in accordance with the fourth aspect of the present invention, since it comprises the solenoid valve that operates the switching valve to a position where communication between the first port and the second port is cut off, it becomes possible, by cutting off communication between the first port and the second port of the switching valve by means of the solenoid valve, to assist the main pump by means of the sub pump without delay, thus enabling speed change to be carried out with high responsiveness even at a time of sudden speed change when there is accelerator pedal kick-down.

Moreover, in accordance with the fifth aspect of the present invention, since the sub pump, which is mainly in charge of lubrication, has a low discharge pressure and a large discharge flow rate, and the main pump, which is mainly in charge of speed change, has a high discharge pressure and a small discharge flow rate, it is possible to reduce the total drive load of the hydraulic pressure source of the transmission.

EXPLANATION OF REFERENCE NUMERALS AND SYMBOLS

19 Torque converter
27a Pulley oil chamber (transmission control system)
28a Pulley oil chamber (transmission control system)
48 Lubrication system
E Engine (drive source)
L1 First oil passage
L2 Second oil passage
L3 Third oil passage
L4 Fourth oil passage
L5 Fifth oil passage
L6 Sixth oil passage
PM Main pump
PS Sub pump
P1 First port of first pressure regulating valve
P2 Second port of first pressure regulating valve
P3 Feedback port of first pressure regulating valve
P4 Feedback port of switching valve
P5 First port of switching valve
P6 Second port of switching valve
P8 First port of second pressure regulating valve
P9 Second port of second pressure regulating valve
P11 Feedback port of second pressure regulating valve
V1 First pressure regulating valve
V2 Switching valve
V3 Second pressure regulating valve
V4 One-way valve
V5 Solenoid valve

MODE FOR CARRYING OUT THE INVENTION

An embodiment of the present invention is explained below by reference to FIG. 1 to FIG. 6.

First Embodiment

Figure 1:
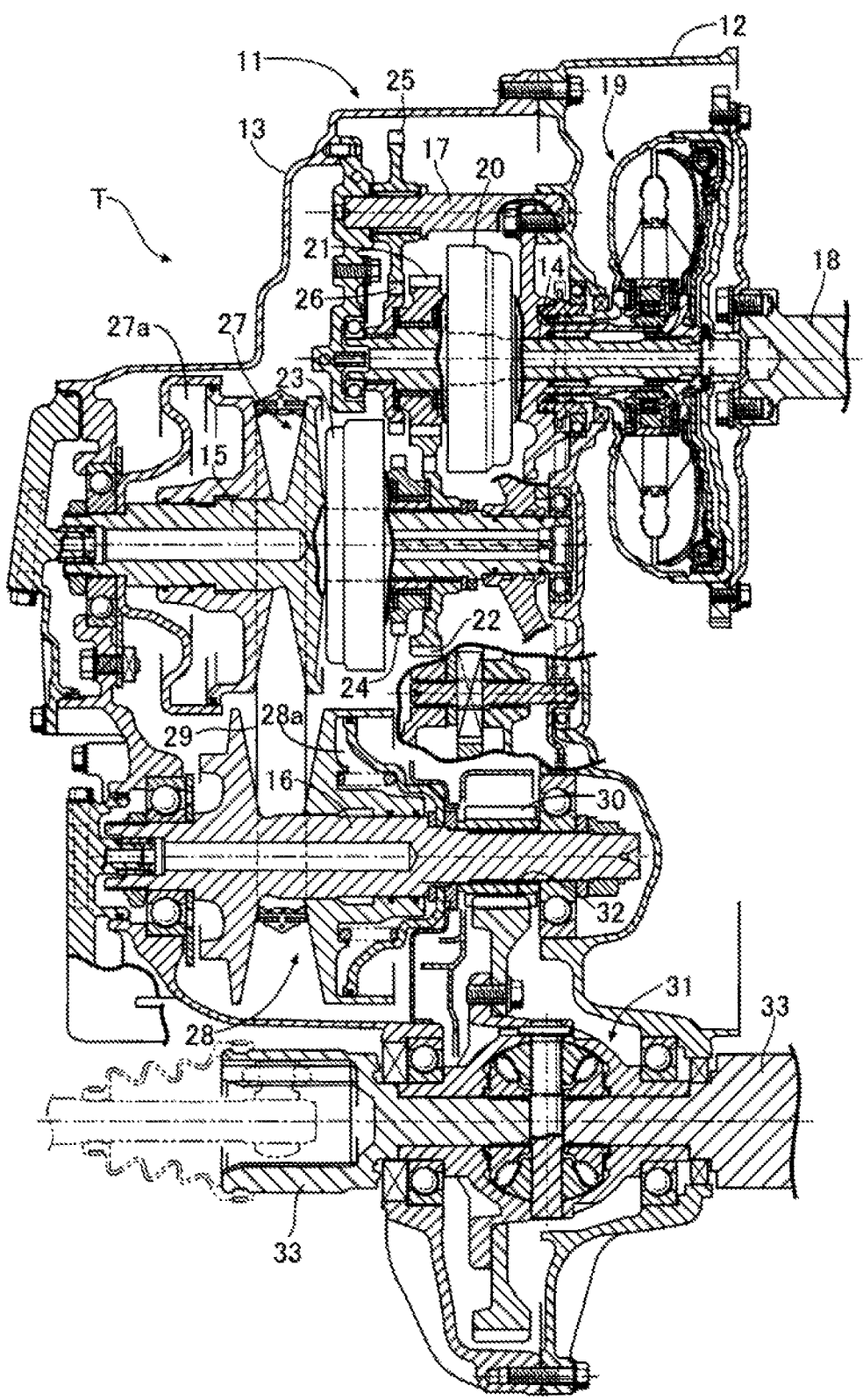
FIG. 1 is a vertical sectional view of a belt type continuously variable transmission. (first embodiment)

First, referring to FIG. 1, the overall structure of a belt type continuously variable transmission T is explained. A transmission case 11 of the belt type continuously variable transmission T includes a torque converter case 12 joined to an engine, which is not illustrated, and a transmission case main body 13 joined to the torque converter case 12; an input shaft 14, a drive pulley shaft 15, a driven pulley shaft 16, and an idle shaft 17 are supported in the interior of the transmission case 11 in parallel to each other.

Relatively rotatably supported on the input shaft 14, which is connected to a crankshaft 18 of the engine via a torque converter 19, is a forward drive gear 21 capable of being joined to the input shaft 14 via a forward clutch 20, this forward drive gear 21 meshing with a forward driven gear 22 fixedly provided on the drive pulley shaft 15. Relatively rotatably supported on the drive pulley shaft 15 is a reverse driven gear 24 capable of being joined to the drive pulley shaft 15 via a reverse clutch 23, this reverse driven gear 24 meshing with a reverse drive gear 26 fixedly provided on the input shaft 14 via an idle gear 25 supported on the idle shaft 17.

A drive pulley 27 supported on the drive pulley shaft 15 and a driven pulley 28 supported on the driven pulley shaft 16 are connected by means of a metal belt 29; controlling the hydraulic pressure supplied to a pulley oil chamber 27a of the drive pulley 27 and a pulley oil chamber 28a of the driven pulley 28 so as to change the groove width of the drive pulley 27 and the driven pulley 28 enables the ratio between the drive pulley shaft 15 and the driven pulley shaft 16 to be varied.

A final drive gear 30 fixedly provided on the driven pulley shaft 16 meshes with a final driven gear 32 fixedly provided on a case of a differential gear 31, and left and right axles 33 and 33 extend from the differential gear 31 to the outside of the transmission case 11.

Therefore, when the forward clutch 20 is engaged and the reverse clutch 23 is disengaged, the driving force of the engine is transmitted to a driven wheel via the path: crankshaft 18→torque converter 19→input shaft 14→forward clutch 20→forward drive gear 21→forward driven gear 22→drive pulley shaft 15→drive pulley 27→metal belt 29→driven pulley 28→driven pulley shaft 16→final drive gear 30→final driven gear 32→differential gear 31→axles 33 and 33, thus making the vehicle travel forward.

Furthermore, when the forward clutch 20 is disengaged and the reverse clutch 23 is engaged, the driving force of the engine is reversed in rotation and transmitted to the driven wheel via the path: crankshaft 18→torque converter 19→input shaft 14→reverse drive gear 26→idle gear 25→reverse driven gear 24→reverse clutch 23→drive pulley shaft 15→drive pulley 27→metal belt 29→driven pulley 28→driven pulley shaft 16→final drive gear 30→final driven gear 32→differential gear 31→axles 33 and 33, thus making the vehicle travel in reverse.

In the case of either forward travel or reverse travel, decreasing the groove width of the drive pulley 27 and increasing the groove width of the driven pulley 28 enables the ratio between the drive pulley shaft 15 and the driven pulley shaft 16 to be continuously increased to thus decrease the vehicle speed; on the other hand, increasing the groove width of the drive pulley 27 and decreasing the groove width of the driven pulley 28 enables the ratio between the drive pulley shaft 15 and the driven pulley shaft 16 to be continuously decreased to thus increase the vehicle speed.

Figure 2:
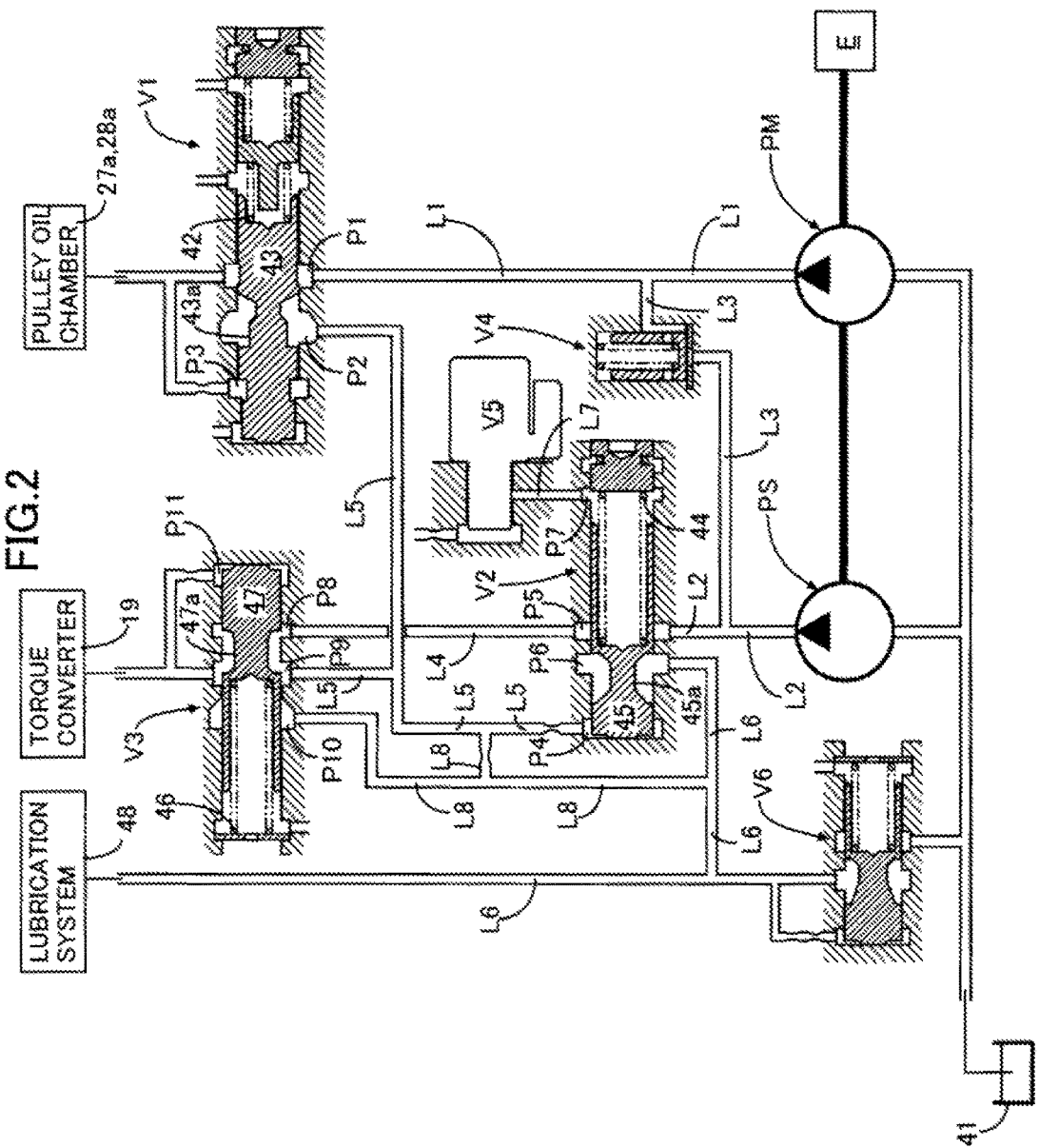
FIG. 2 is a hydraulic circuit diagram of the belt type continuously variable transmission. (first embodiment)

A hydraulic circuit of the belt type continuously variable transmission T is now explained by reference to FIG. 2.

The hydraulic circuit includes a main pump PM and a sub pump PS that are driven by an engine E, which is the drive source for the belt type continuously variable transmission T. The characteristics of the main pump PM, which is mainly used for speed change, are set so that the discharge pressure is relatively high and the discharge flow rate is relatively small, and the characteristics of the sub pump PS, which is mainly used for lubrication, are set so that the discharge pressure is relatively low and the discharge flow rate is relatively large, this enabling the total drive load of the hydraulic source for the belt type continuously variable transmission T to be reduced.

Oil that has been pumped up by the main pump PM from an oil tank 41 is supplied to a first oil passage L1, and is supplied from the first oil passage L1 to the pulley oil chambers 27a and 28a, etc. of a transmission control system of the belt type continuously variable transmission T via a first pressure regulating valve V1. Oil that has been pumped up by the sub pump PS from the oil tank 41 is supplied to a second oil passage L2, and is supplied from the second oil passage L2 to the torque converter 19 via a switching valve V2, a fourth oil passage L4, and a second pressure regulating valve V3 and is also supplied from the second oil passage L2 to a lubrication system 48 of each bearing etc. of the belt type continuously variable transmission T via the switching valve V2 and a sixth oil passage L6. The first oil passage L1 and the second oil passage L2 are connected via a third oil passage L3, and a one-way valve V4 is disposed in the third oil passage L3. The one-way valve V4 cuts off the flow of oil from the first oil passage L1 to the second oil passage L2 and allows the flow of oil from the second oil passage L2 to the first oil passage L1.

The first pressure regulating valve V1 includes a spool 43 urged leftward by means of a spring 42; formed in the spool 43 are a groove 43a as well as a first port P1, a second port P2 and a feedback port P3, which face an outer peripheral face of the spool 43. The first port P1 is connected to the first oil passage L1 and the pulley oil chambers 27a and 28a, the feedback port P3 is connected to the pulley oil chambers 27a and 28a, and the second port P2 is connected to a feedback port P4 of the switching valve V2 and a second port P9 of the second pressure regulating valve V3 via an oil passage L5.

The switching valve V2 includes a spool 45 urged leftward by means of a spring 44; formed in the spool 45 are a groove 45a as well as a first port P5, a second port P6, a third port P7, and the feedback port P4, which face an outer peripheral face of the spool 45. The first port P5 is connected to the second oil passage L2 as well as to a first port P8 of the second pressure regulating valve V3 via the fourth oil passage L4, the second port P6 is connected to the sixth oil passage L6, and the third port P7 is connected to an ON/OFF type solenoid valve V5 via a seventh oil passage L7.

The second pressure regulating valve V3 includes a spool 47 urged rightward by means of a spring 46; formed in the spool 47 is a groove 47a as well as the second port P9, a third port P10, a feedback port P11, and the first port P8, which face the outer periphery of the spool 47. The first port P8 is connected to the fourth oil passage L4, the second port P9 is connected to the fifth oil passage L5 and the torque converter 19, and the third port P10 is connected to the second port P6 of the switching valve V2, the fifth oil passage L5, and the lubrication system 48 via an eighth oil passage L8. The sixth oil passage L6 is connected to the oil tank 41 via a relief valve V6.

The operation of the embodiment of the present invention having the above arrangement is now explained.

Since the oil in the interior of the torque converter 19 flows downward due to gravity to the bottom part of the transmission case 11 when the vehicle is in a stopped state for a long time, transmission of driving force cannot be carried out until the interior of the torque converter 19 is filled with oil when the engine E is subsequently started, and the vehicle sometimes cannot start running promptly.

Figure 3:
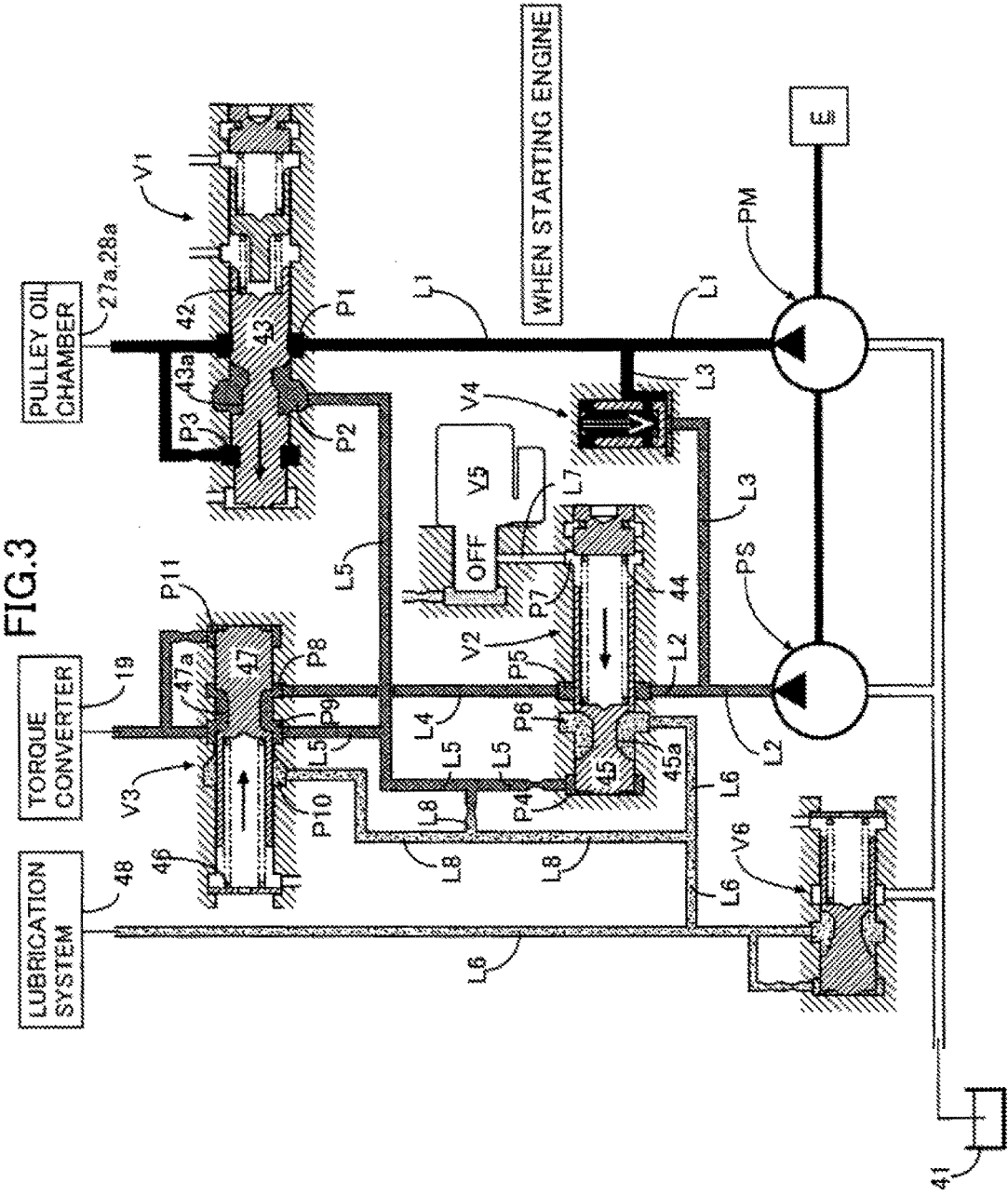
FIG. 3 is a hydraulic circuit diagram for explaining the operation when starting an engine. (first embodiment)
Figure 4:
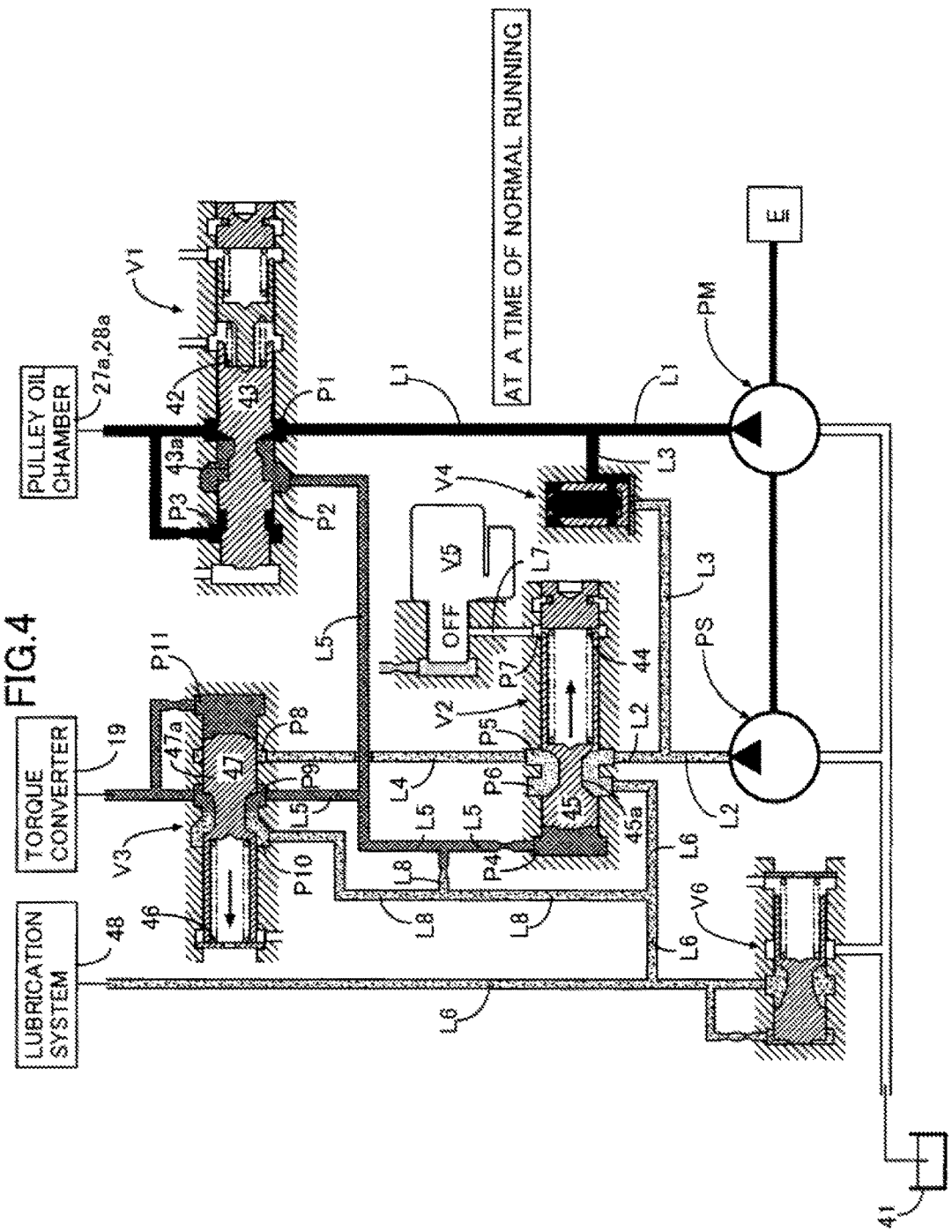
FIG. 4 is a hydraulic circuit diagram for explaining the operation at a time of normal running. (first embodiment)

In accordance with the present embodiment, as shown in FIG. 3, when the engine E starts and the main pump PM operates, since the hydraulic pressure of the pulley oil chambers 27a and 28a has not yet risen, the spool 43 of the first pressure regulating valve V1 is moved leftward by the resilient force of the spring 42, thus cutting off communication between the first port P1 and the second port P2. Therefore, oil discharged by the main pump PM is supplied via the path: first oil passage L1→first port P1 of first pressure regulating valve V1→pulley oil chambers 27a and 28a, thus enabling the belt type continuously variable transmission T to change speed.

Oil discharged by the sub pump PS, which operates together with the main pump PM, is supplied via the path: second oil passage L2→first port P5 of switching valve V2→fourth oil passage L4→first port P8 and second port P9 of second pressure regulating valve V3→torque converter 19. In this process, the internal pressure of the torque converter 19 is low since filling with oil is not yet completed, the hydraulic pressure acting on the feedback port P4 of the switching valve V2 gives way to the resilient force of the spring 44, the spool 45 moves leftward to thus cut off communication between the first port P5 and the second port P6 of the switching valve V2, and the oil discharged by the sub pump PS cannot be supplied to the lubrication system 48. Furthermore, the hydraulic pressure acting on the feedback port P11 of the second pressure regulating valve V3 gives way to the resilient force of the spring 46, the spool 47 moves rightward to thus provide communication between the first port P8 and the second port P9 of the second pressure regulating valve V3, and oil discharged by the sub pump PS is supplied only to the torque converter 19.

Since the discharge pressure of the main pump PM is higher than the discharge pressure of the sub pump PS, the one-way valve V4, which is disposed in the third oil passage L3 connecting the first oil passage L1 and the second oil passage L2, closes, and the oil discharged by the main pump PM does not flow toward the sub pump PS side.

In this way, since all the oil discharged by the sub pump PS is supplied to the torque converter 19 when starting the engine E, it is possible to promptly refill the torque converter 19, from which oil has drained, with oil to thus enable transmission of driving force and the vehicle to be started without delay. While the torque converter 19 is being filled, oil is not supplied to the lubrication system 48, but since the duration is very short, this is not a problem.

When filling of the torque converter 19 is completed as described above, as shown in FIG. 4 the internal pressure of the torque converter 19 increases, and the hydraulic pressure acting on the feedback port P11 of the second pressure regulating valve V3 makes the spool 47 move leftward against the resilient force of the spring 46, thus cutting off communication between the first port P8 and the second port P9 and providing communication between the second port P9 and the third port P10. The hydraulic pressure acting on the feedback port P4 of the switching valve V2 makes the spool 45 move rightward against the resilient force of the spring 44, thus providing communication between the first port P5 and the second port P6.

Furthermore, due to the hydraulic pressure of the pulley oil chambers 27a and 28a rising sufficiently, the hydraulic pressure acting on the feedback port P3 of the first pressure regulating valve V1 makes the spool 43 move rightward up to a position where it balances the resilient force of the spring 42, the first port P1 communicates with the second port P2 to thus exhibit a pressure regulating function, and thereafter surplus oil generated by the main pump PM and pressure-regulated by the first pressure regulating valve V1 is supplied to the second pressure regulating valve V3 via the fifth oil passage L5 and pressure-regulated by the second pressure regulating valve V3 and supplied to the torque converter 19.

The oil discharged by the sub pump PS is supplied via the path: second oil passage L2→first port P5 and second port P6 of switching valve V2→sixth oil passage L6→lubrication system 48, and caters only for the application to lubrication. Therefore, it is possible, by lowering the discharge pressure of the sub pump PS, to reduce the drive load of the engine E. In this process, since the discharge pressure of the main pump PM is higher than the discharge pressure of the sub pump PS, the one-way valve V4 disposed in the third oil passage L3 connecting the first oil passage L1 and the second oil passage L2 closes, thus preventing the oil discharged by the main pump PM from flowing toward the sub pump PS side.

Figure 5:
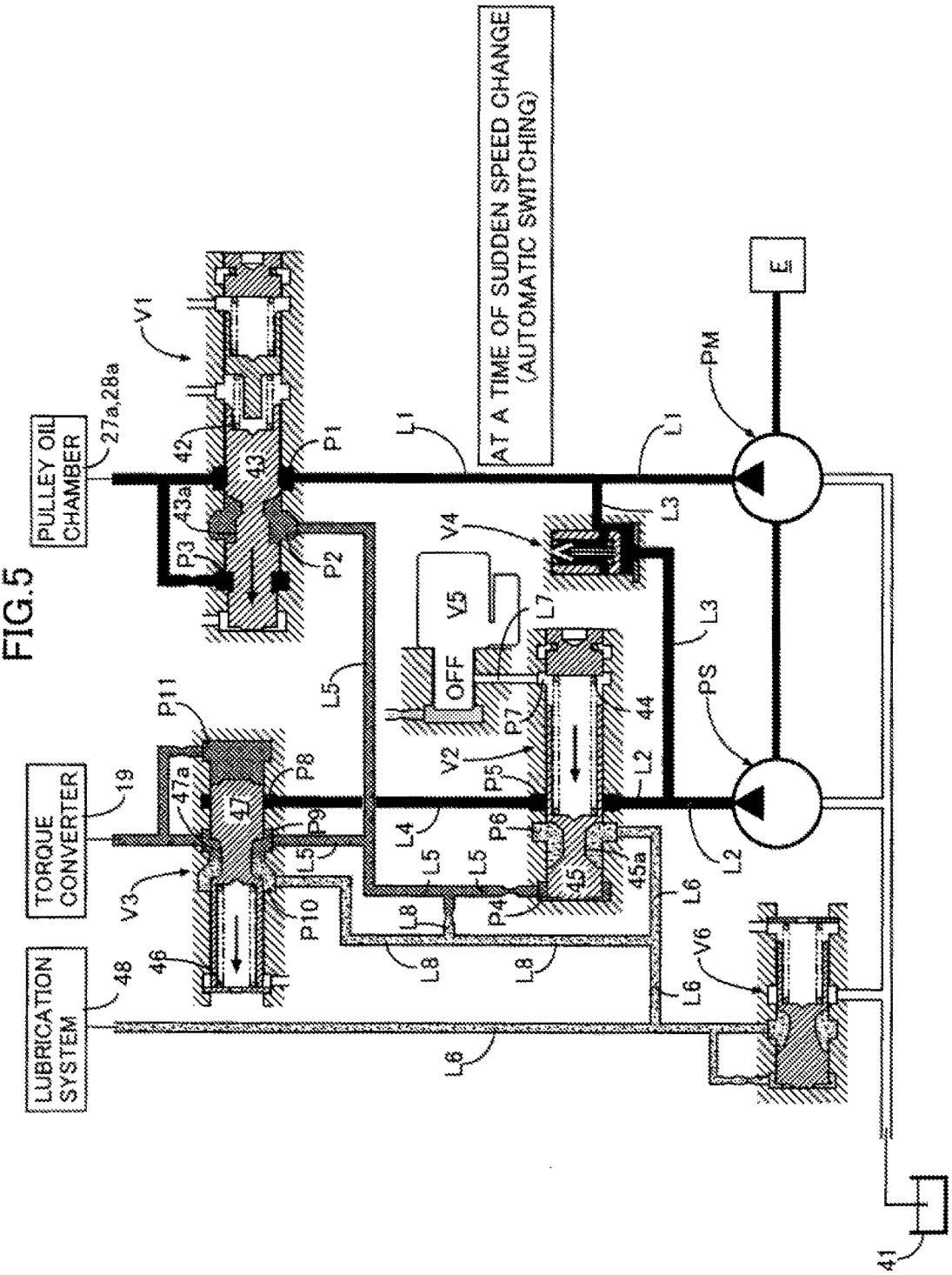
FIG. 5 is a hydraulic circuit diagram for explaining the operation of automatic switching at a time of sudden speed change. (first embodiment)

When the vehicle is suddenly accelerated or decelerated, since the gear ratio of the belt type continuously variable transmission T changes rapidly, a large amount of oil is consumed in the pulley oil chambers 27a and 28a. As a result, as shown in FIG. 5, the hydraulic pressure of the feedback port P3 of the first pressure regulating valve V1 decreases, the spool 43 moves leftward due to the resilient force of the spring 42, communication between the first port P1 and the second port P2 is cut off, and the entire amount of oil discharged by the main pump PM is supplied to the pulley oil chambers 27a and 28a, none being supplied to the torque converter 19.

When communication between the first port P1 and the second port P2 of the first pressure regulating valve V1 is cut off, the hydraulic pressure acting on the feedback port P4 of the switching valve V2 decreases, and the spool 45 moves leftward due to the resilient force of the spring 44, thus cutting off communication between the first port P5 and the second port P6. As a result, the fourth oil passage IA is blocked, the discharge pressure of the sub pump PS increases and exceeds the discharge pressure of the main pump PM, the one-way valve V4 of the third oil passage L3 opens, the oil discharged by the sub pump PS is therefore supplied to the first oil passage L1, the main pump PM is assisted by the sub pump PS to thus supply a sufficient amount of oil to the pulley oil chambers 27a and 28a, and it becomes possible to ensure the speed change responsiveness for the belt type continuously variable transmission T. In this process, the supply of oil to the torque converter 19 and the lubrication system is cut off, but since the duration is short this is not a problem.

When communication between the first port P1 and the second port P2 of the first pressure regulating valve V1 is cut off, the hydraulic pressure acting on the feedback port P11 of the second pressure regulating valve V3 also decreases, but since the resilient force of the spring 46 is set so as to be weak, the hydraulic pressure acting on the feedback port P11 surpasses the resilient force of the spring 46, and the spool 47 is held at the leftward-moved position.

Figure 6:
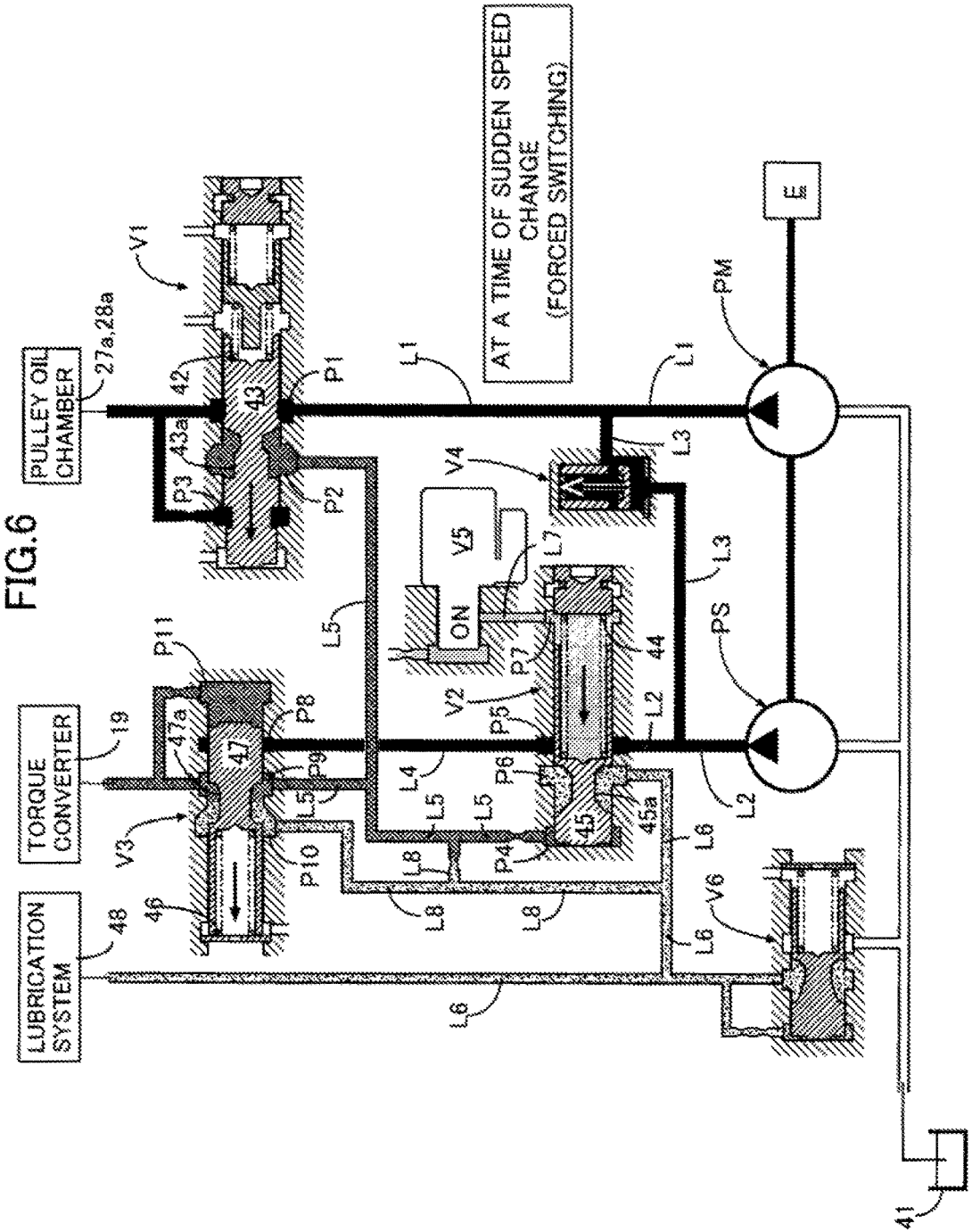
FIG. 6 is a hydraulic circuit diagram for explaining the operation of forced switching at a time of sudden speed change. (first embodiment)

Since a slight time delay occurs in switching of the switching valve V2, which is explained by reference to FIG. 5, it is necessary to further enhance the speed change responsiveness of the belt type continuously variable transmission T at a time of sudden speed change. In such a case, as shown in FIG. 6, opening the solenoid valve V5 to thus supply the line pressure to the third port P7 of the switching valve V2 forces the spool 45 to move leftward against the hydraulic pressure of the feedback port P4, thus enabling the fourth oil passage IA to be quickly blocked and the sub pump PS to assist the main pump PM and thereby enabling the speed change responsiveness of the belt type continuously variable transmission T to be further enhanced.

An embodiment of the present invention is explained above, but the present invention may be modified in a variety of ways as long as the modifications do not depart from the spirit and scope thereof.

For example, the drive source for the main pinup PM and the sub pump PS is not limited to the engine E and may be another type of drive source such as an electric motor.

Furthermore, the transmission of the present invention is not limited to the belt type continuously variable transmission T of the embodiment and may be a chain type continuously variable transmission or a toroidal type continuously variable transmission.

The invention claimed is:

1. A hydraulic circuit for a transmission comprising a main pump and a sub pump driven by a common drive source, oil discharged by the main pump being supplied to a transmission control system, and oil discharged by the sub pump being supplied to a lubrication system, wherein
the hydraulic circuit comprises a switching valve that assists the main pump by increasing a discharge pressure of the sub pump when a discharge flow rate of the main pump is insufficient,
a first pressure regulating valve that adjusts a hydraulic pressure supplied from the main pump to the transmission control system,
a first oil passage that connects a discharge port of the main pump and a first port of the first pressure regulating valve,
a second oil passage that connects a discharge port of the sub pump and a first port of the switching valve,
a third oil passage that connects the discharge port of the main pump and the discharge port of the sub pump,
a one-way valve that is disposed in the third oil passage and opens when the discharge pressure of the sub pump is higher than a discharge pressure of the main pump,
a second pressure regulating valve that adjusts a hydraulic pressure supplied from the main pump or the sub pump to a torque converter,
a fourth oil passage that connects the first port of the switching valve and a first port of the second pressure regulating valve,
a fifth oil passage that connects a second port of the first pressure regulating valve, a second port of the second pressure regulating valve, and a feedback port of the switching valve, and
a sixth oil passage that connects a second port of the switching valve and the lubrication system.

2. The hydraulic circuit for a transmission according to claim 1, wherein the second pressure regulating valve comprises a feedback port that is connected to the second port thereof, and when an internal pressure of the torque converter attains a predetermined value or greater, communication between the first port and the second port of the second pressure regulating valve is cut off and the first port and the second port of the switching valve are made to communicate with each other.

3. The hydraulic circuit for a transmission according to claim 1, wherein the first pressure regulating valve comprises a feedback port that is connected to the first port thereof, and when the internal pressure of the torque converter attains a predetermined value or below, communication between the first port and the second port of the switching valve is cut off.

4. The hydraulic circuit for a transmission according to claim 3, comprising a solenoid valve that operates the switching valve to a position where communication between the first port and the second port is cut off.

5. The hydraulic circuit for a transmission according to claim 1, wherein the sub pump has a low discharge pressure and a large discharge flow rate compared with the main pump.

6. The hydraulic circuit for a transmission according to claim 2, wherein the first pressure regulating valve comprises a feedback port that is connected to the first port thereof, and when the internal pressure of the torque converter attains a predetermined value or below, communication between the first port and the second port of the switching valve is cut off.

7. The hydraulic circuit for a transmission according to any one of claim 2, wherein the sub pump has a low discharge pressure and a large discharge flow rate compared with the main pump.

8. The hydraulic circuit for a transmission according to any one of claim 3, wherein the sub pump has a low discharge pressure and a large discharge flow rate compared with the main pump.

9. The hydraulic circuit for a transmission according to any one of claim 4, wherein the sub pump has a low discharge pressure and a large discharge flow rate compared with the main pump.

* * * * *